US008924315B2

(12) United States Patent
Archambeau et al.

(10) Patent No.: US 8,924,315 B2
(45) Date of Patent: Dec. 30, 2014

(54) MULTI-TASK LEARNING USING BAYESIAN MODEL WITH ENFORCED SPARSITY AND LEVERAGING OF TASK CORRELATIONS

(75) Inventors: Cedric Archambeau, Grenoble (FR); Shengbo Guo, Saint-Martin-d'Heres (FR); Onno Zoeter, Grenoble (FR); Jean-Marc Andreoli, Meylan (FR)

(73) Assignee: Xerox Corporation, Norwalk, CT (US)

( * ) Notice: Subject to any disclaimer, the term of this patent is extended or adjusted under 35 U.S.C. 154(b) by 478 days.

(21) Appl. No.: 13/324,060

(22) Filed: Dec. 13, 2011

(65) Prior Publication Data

US 2013/0151441 A1 Jun. 13, 2013

(51) Int. Cl.
G06F 15/18 (2006.01)
G06F 19/24 (2011.01)
(52) U.S. Cl.
USPC .................. 706/12; 706/20; 706/21
(58) Field of Classification Search
USPC .......................................................... 706/21
See application file for complete search history.

(56) References Cited

PUBLICATIONS

Zhang et al., Learning Multiple Tasks with a Sparse Matrix-Normal Penalty [online], 2010 [retrieved on May 9, 2014]. Retrieved from the Internet<URL:http://bluecoat-05/?cfru=aHR0cDovL3Bhc GVycy5uaXBzLmNjL3BhcGVyLzQwOTUtbGVhcm5pbmctbXV sdGlwbGUtdGFza3Mtd210aC1hLXNwYXJzZS1tYXRyaXgtbm9y bWFsLXBlbmFsdHkucGRm>.*
Ando, et al. "A Framework for Learning Predictive Structures from Multiple Tasks and Unlabeled Data," *JMLR*, 6, pp. 1817-1853, (2005).

Argyriou, et al., "Convex multi-task feature learning," *Machine Learning*, 73, pp. 243-272, (2008).
Bakker, et al. "Task clustering and gating for bayesian multitask learning," *JMLR*, 4, pp. 83-99, (2003).
Beal, "Variational Algorithms for Approximate Bayesian Inference," PhD thesis, Gatsby Computational Neuroscience Unit, University College London, (2003).
Berger, "Statistical Decision Theory and Bayesian Analysis," Springer, New York, (1985).
Boutell, et al., "Learning multi-label scene classification," *Pattern Recognition*, 37(9) pp. 1757-1771, (2004).
Candès, et al. "Robust principal component analysis?," *Journal of the ACM*, 58 pp. 1-37, (Oct. 2010).
Caruana, "Multitask Learning," *Machine Learning*, 28(1) pp. 41-75, (1997).
Chapelle, et al. "Multi-task learning for boosting with application to web search ranking," *SIGKDD*, pp. 1189-1198, (2010).

(Continued)

*Primary Examiner* — Jeffrey A. Gaffin
*Assistant Examiner* — Nathan Brown, Jr.
(74) *Attorney, Agent, or Firm* — Fay Sharpe LLP

(57) ABSTRACT

Multi-task regression or classification includes optimizing parameters of a Bayesian model representing relationships between D features and P tasks, where D≥1 and P≥1, respective to training data comprising sets of values for the D features annotated with values for the P tasks. The Bayesian model includes a matrix-variate prior having features and tasks dimensions of dimensionality D and P respectively. The matrix-variate prior is partitioned into a plurality of blocks, and the optimizing of parameters of the Bayesian model includes inferring prior distributions for the blocks of the matrix-variate prior that induce sparseness of the plurality of blocks. Values of the P tasks are predicted for a set of input values for the D features using the optimized Bayesian model. The optimizing also includes decomposing the matrix-variate prior into a product of matrices including a matrix of reduced rank in the tasks dimension that encodes correlations between tasks.

16 Claims, 5 Drawing Sheets

(56) References Cited

PUBLICATIONS

Chari, et al. "SIGMA: A System for Integrative Genomic Microarray Analysis of Cancer Genomes," *BMC Genomics*, 7 pp. 324, (2006).
Chen, et al., "Learning incoherent sparse and low-rank patterns from multiple tasks," *SIGKDD*, pp. 1179-1188, (2010).
Elisseeff, et al., "A kernel method for multi-labelled classification," *NIPS*. pp. 681-687(2001).
Evgeniou,et al., "Learning Multiple Tasks with Kernel Methods," *JMLR*, 6, pp. 615-637, (2005).
Figueiredo, "Adaptive sparseness for supervised learning," *IEEE Transactions on PAMI*, 25, pp. 1150-1159, (2003).
Gelman, et al., *"Data Analysis Using Regression and Multilevel/Hiererarchical Models,"* Cambridge University Press, (2007).
Hernández-Lobato, et al. "Expectation propagation for Bayesian multi-task feature selection," *ECML-PKDD*, pp. 522-537, (2010).
Jacob, et al., "Clustered Multi-Task Learning: A Convex Formulation," *NIPS*, pp. 745-752. (2009).
Jebara, "Multitask Sparsity via Maximum Entropy Discrimination," *JMLR*, 12 pp. 75-110, (Jan. 2011).
Makadia, et al., "A new baseline for image annotation," *ECCV*, (2008).
Neal, et al., "A view of the EM algorithm that justifies incremental, sparse, and other variants," In M. I. Jordan, editors, *Learning in Graphical Models*, pp. 355-368. MIT press, (1998).
Rai,et al., "Infinite Predictor Subspace Models for Multitask Learning," *AISTATS*, pp. 613-620, (2010).
Rai,et al., "Multi-Label Prediction via Sparse Infinite CCA," *NIPS*, pp. 1518-1526. (2009).
Raman,et al., "The Bayesian group-Lasso for analyzing contingency tables," *ICML*, pp. 881-888, (2009).
Torralba, et al., "Sharing features: efficient boosting procedures for multiclass object detection," *CVPR*, IEEE Computer Society., pp. 762-769, (2004).
Wainwright, "Sharp Thresholds for High-Dimensional and Noisy Sparsity Recovery Using $l_1$-Constrained Quadratic Programming (Lasso)," *IEEE Transactions on Information Theory*, 55(5) pp. 2183-2202, (2009).
Xue,et al., "The matrix stick-breaking process for flexible multi-task learning," *ICML*, pp. 1063-1070, (2007).
Yuan, et al., "Model selection and estimation in regression with grouped variables," *J. R. Statistic. Soc. B*, 68(1) pp. 49-67, (2006).
Zhang, "Learning Multiple Tasks with a Sparse Matrix-Normal Penalty," *NIPS*, pp. 2550-2558. (2010).

* cited by examiner

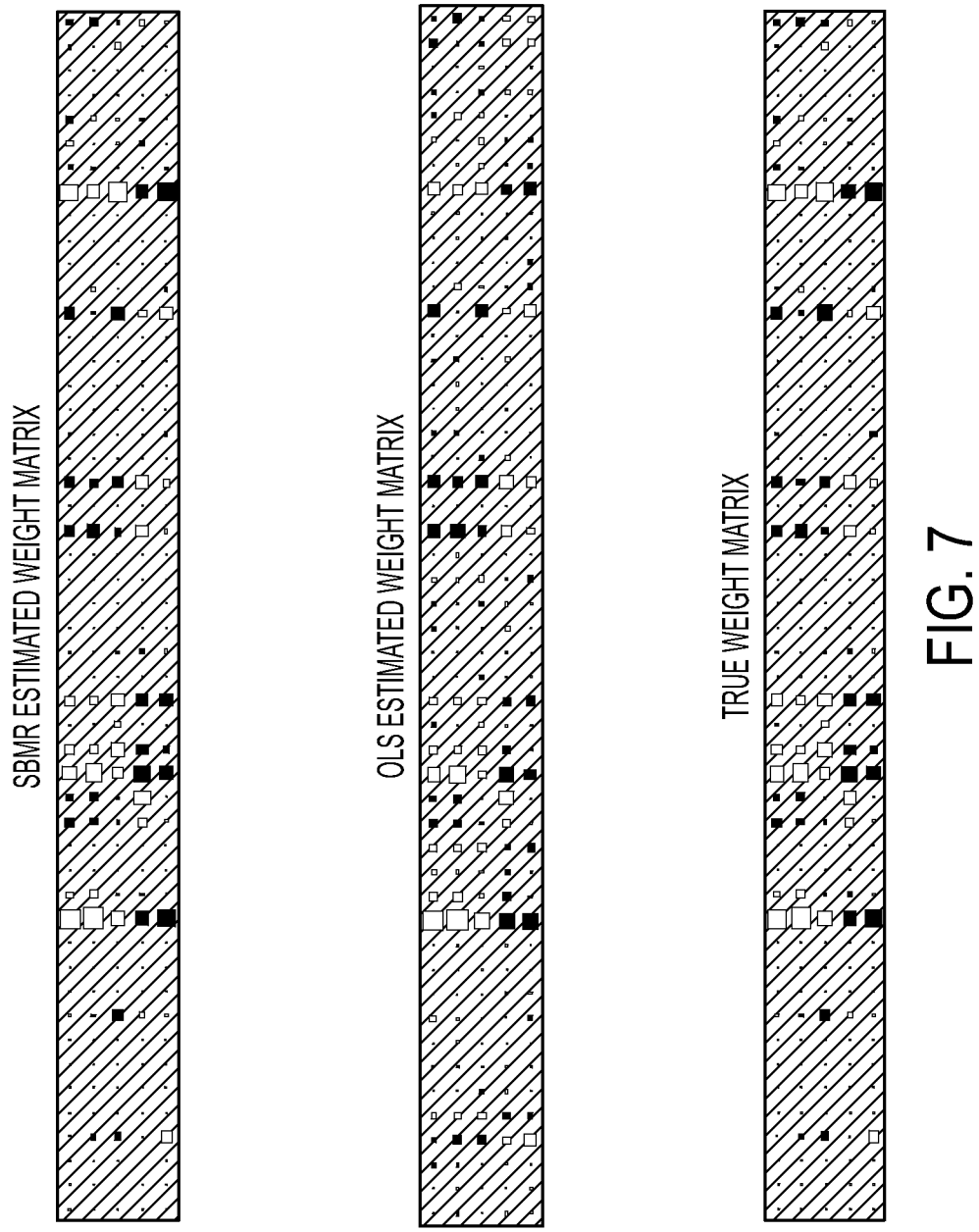

MULTI-TASK LEARNING USING BAYESIAN MODEL WITH ENFORCED SPARSITY AND LEVERAGING OF TASK CORRELATIONS

BACKGROUND

The following relates to the information management arts, information classification and retrieval arts, data mining arts, prediction arts, and related arts.

Multi-task machine learning entails learning to predict multiple related tasks based on a common training set annotated with the multiple tasks. The resulting trained multi-task classifier or regression model finds application in numerous fields, ranging from the prediction of tests scores in social sciences, the classification of protein functions in systems biology, the categorisation of scenes in computer vision, database (e.g., Internet) search and ranking, and so forth. In many such applications, multiple related target variables (i.e., tasks) are to be predicted from a common set of input features.

To further illustrate, consider a multi-task learning problem in which it is desired to assign an image to one or more classes based on image features extracted from the image. Typically, the image features are arranged as a features vector which serves as input to a trained multi-task classifier. In this case each task corresponds to a class and decides whether the image belongs to that class, so that (by way of example) if there are twenty classes then the classifier has twenty tasks each outputting a binary value indicating whether the image should be assigned to the corresponding class. Advantageously, the multi-task classifier enables a single image to be assigned to multiple classes, where appropriate. In this case, one could envision independently training twenty single-task classifiers and applying them in parallel to perform the multi-task classification. However, this approach would lose any information that might be mined from correlations between tasks.

A closely related but more difficult multi-task learning problem is to label an image with textual keywords based on the image features extracted from the image. The problem can be made equivalent to the image classification problem by defining each available textual keyword as a "class". However, this problem is more challenging because the number of "classes" is now equal to the vocabulary size which is typically quite large. This problem highlights the value of capturing correlations between the tasks, since keywords that are synonyms or otherwise positively related are likely to have high positive labeling correlation. For example, an image that is labeled with the keyword "flower" is more likely to be also appropriately labeled with the keyword "nature scene". Negative correlations are also useful. For example, the image labeled "flower" is less likely to also be appropriately labeled "industrial scene".

Thus, in multitask learning problems it would be useful to leverage task correlations (both positive and negative) in learning the multi-task classifier or regression model. However, attempting to simultaneously learn multiple tasks in a way that leverages correlations between tasks is difficult, and typically becomes problematically or prohibitively computationally intensive.

Additionally, in any learning problem it would be useful to integrate feature selection into the modeling, that is, to emphasize features that are highly discriminative while limiting or eliminating less descriminative features from consideration. A common approach is to apply feature reduction in which the discriminativeness of features is quantified and less discriminative features are discarded. In the multi-task setting, however, it is difficult to quantify the discriminativeness of a feature on a global scale. For example, a feature may be largely irrelevant for most tasks but highly discriminative for a few tasks.

One way to formulate a multitask problem is a matrix formulation in which the model is applied to the feature vector to generate the task predictions. Mathematically, this can be written as:

$$y_n = f(Wx_n + \mu) + \epsilon_n \quad (1)$$

where $x_n \in \mathbb{R}^D$ is an input feature vector having D features, $y_n \in \mathbb{R}^P$ is the vector of P task predictions, $\epsilon_n \sim \mathcal{N}(0,\Sigma)$, $f(\ldots)$ is a (possibly nonlinear) function, and where $W \in \mathbb{R}^{P \times D}$ is the matrix of weights, $\mu \in \mathbb{R}^P$ is the task offsets, and $\epsilon_n \in \mathbb{R}^P$ is the vector residual errors with covariance $\Sigma \in \mathbb{R}^{P \times P}$. In this setting, the output of all tasks, i.e. $y_n$, is observed for every input $x_n$. In general, it is understood that feature selection can be achieved by making the model matrix W sparse, for example in the context of a (relaxed) convex optimization framework or a Bayesian framework. An advantage of the Bayesian approach is that it enables the degree of sparsity to be learned from the data, and does not require a priori specification of the type of penalization. However, the dimensionality of the model matrix is large ($W \in \mathbb{R}^{P \times D}$). Enforcing sparsity over this large matrix, while also leveraging correlations (both positive and negative) between tasks, is a difficult problem.

BRIEF DESCRIPTION

In some illustrative embodiments disclosed as illustrative examples herein, an apparatus comprises an electronic data processing device configured to perform a method comprising: constructing a Bayesian model representing relationships between a plurality of features and a plurality of tasks wherein the Bayesian model includes a matrix variate prior having a features dimension and a tasks dimension and wherein the matrix variate prior is partitioned into a plurality of blocks; generating an optimized Bayesian model by optimizing parameters of the Bayesian model respective to training data comprising sets of feature values annotated with values for tasks of the plurality of tasks wherein the optimizing includes inferring prior distributions for the blocks of the matrix variate prior that induce sparseness of the plurality of blocks; and predicting values of tasks of the plurality of tasks for an input set of feature values using the optimized Bayesian model.

In some illustrative embodiments disclosed as illustrative examples herein, a method comprises: generating an optimized Bayesian model by optimizing parameters of a Bayesian model representing relationships between a plurality of features and a plurality of tasks respective to training data comprising sets of feature values annotated with values for tasks of the plurality of tasks, the Bayesian model including a matrix variate prior having a features dimension and a tasks dimension, the optimizing including decomposing the matrix variate prior into a product of matrices including a matrix of reduced rank in the tasks dimension that encodes positive or negative correlations between tasks of the plurality of tasks; and predicting values of tasks of the plurality of tasks for an input set of feature values using the optimized Bayesian model. The generating and predicting are suitably performed by an electronic data processing device.

In some illustrative embodiments disclosed as illustrative examples herein, a storage medium stores instructions executable by an electronic data processing device to perform operations including (1) generating an optimized Bayesian model by optimizing parameters of a Bayesian model representing relationships between D features and P tasks, where D≥1 and P≥1, respective to training data comprising sets of values for the D features annotated with values for the P tasks, the Bayesian model including a matrix-variate prior having a features dimension of dimensionality D corresponding to the D features and a tasks dimension of dimensionality P corresponding to the P tasks, wherein the matrix-variate prior is partitioned into a plurality of blocks and the optimizing of parameters of the Bayesian model includes inferring prior distributions for the blocks of the matrix-variate prior that induce sparseness of the plurality of blocks and (2) predicting values of the P tasks for a set of input values for the D features using the optimized Bayesian model.

BRIEF DESCRIPTION OF THE DRAWINGS

FIGS. 3-7 present various experimental results as described herein.

DETAILED DESCRIPTION

Figure 1:
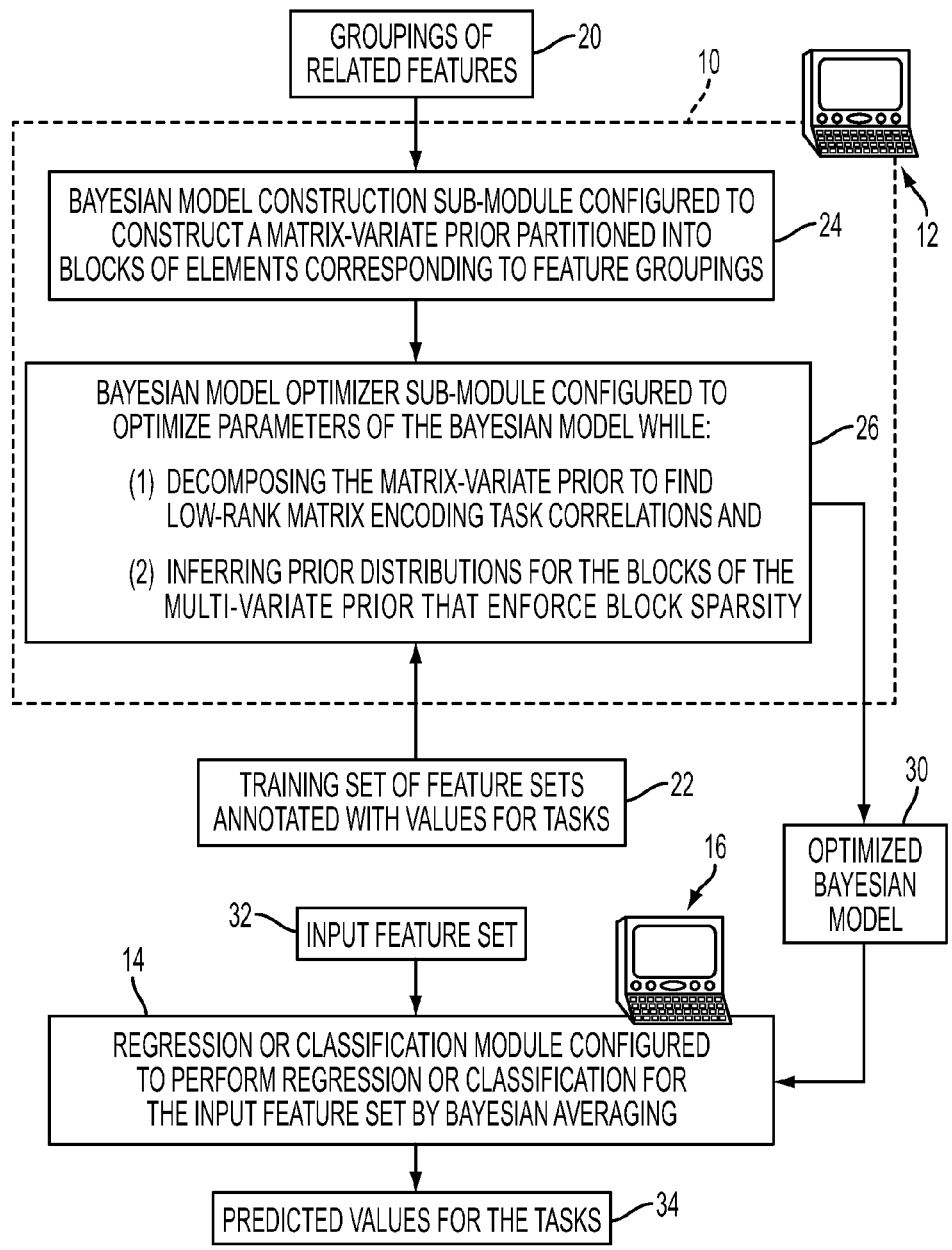
FIG. 1 diagrammatically shows a multi-task regression or classification system as disclosed herein.

Disclosed herein are multi-task classification or regression approaches that simultaneously leverage both (1) correlations (including "negative" or "anti"-correlations) between tasks and (2) the group sparsity in features. Instead of treating these as two independent model constraints, the disclosed approaches formulate both in terms of prior preferences over model structure encoded in a probabilistic graphical model. A linear model is employed, in which the output is predicted from a linear combination of the features. Correlations between both features and tasks are captured by having the coefficients of the combination to be random variables. Multi-tasking is captured in that the coefficients form a random matrix rather than a random vector. In the illustrative formulation, each row of the matrix corresponds to a task and each column corresponds to a feature (the skilled artisan can readily convert to the opposite formalism in which tasks correspond to rows and features to columns). Correlations between features (illustrative columns) and between tasks (illustrative rows) are handled separately and are combined multiplicatively.

In the disclosed approaches, the correlations between tasks are captured by a low rank approximation of the covariance matrix, which is numerically stable even for a large number of tasks. This joint matrix approach enables modeling of both positive and negative correlations between tasks, without imposing any constraint on the correlation sign or order. For example two tasks might be strongly negatively correlated (by way of illustrative example, the answers to questions that are rephrased in a negative sense).

Sparsity is accounted for by selecting the prior distribution on that matrix. First, the matrix is configured to be block decomposable, with each block corresponding to an a priori known feature group. The feature groups are assumed to be disjoint. The blocks of features are defined based on information about relationships between features. For example, when a nominal variable is discretized the resulting features form a natural feature group. Another example is a set of nonlinear transformation of the same variables. These are merely two examples. Each block is made sparse by imposing it to be (up to noise) the product of low rank matrices and by imposing an appropriate prior on the scale of the noise.

Any suitable method can be applied to learn the parameters of the resulting Bayesian network or model and to perform inference using the trained Bayesian model. In some embodiments the learning and inference is performed efficiently using an algorithm derived from the generic methodology known as "variational approximation". This methodology suggests looking for approximate posterior distributions in a factorized form.

The disclosed methods perform classification or regression where the output may consist of multiple possibly correlated components (a.k.a. multi-task or multi-view regression), where the correlation can be both positive and negative, and where the input is represented as a vector of possibly correlated features, partitioned into known clusters to be treated as groups in the prediction.

Thus, in the disclosed approaches the multi-task learning problem is expressed as a probabilistic graphical model using prior probabilities configured to ensure group sparsity, that is, configured to bias toward the most relevant feature groups being used to perform the prediction. In some embodiments the problem is expressed as a probabilistic graphical model using appropriate prior probabilities to ensure that correlations between tasks is exploited, that is, to ensure that common structure is picked up and used for better prediction already after a limited number of observations. In some such embodiments, the covariance between tasks is approximated by a low rank matrix. With this approach, the method remains numerically stable even with a large number of correlated tasks. In some embodiments an appropriate factorization of the posterior probability is assumed and computed using an iterative algorithm derived from the generic "variational" approximation framework.

With reference to FIG. 1, a multi-task classifier or regression system is illustrated. The system includes a multi-task learning module 10 implemented on a computer or other electronic data processing device 12, and an inference module 14 implemented on a computer or other electronic data processing device 16. In the illustrative example of FIG. 1, the learning module 10 and the inference module 14 are embodied by two different respective computers 12, 16; however, it is contemplated for the learning and inference components to both be embodied by the same computer. Moreover, although computers 12, 16 are illustrated, the electronic data processing device or devices 12, 16 can be variously embodied as one or more computers, one or more network-based servers, one or more mobile devices such as a personal data assistant (PDA), smartphone, or tablet computer, various combinations of the foregoing, or so forth. The electronic processing device or devices 12, 16 includes a display or other suitable output device, and may optionally include a user input device such as a keyboard, mouse, trackball, trackpad, or so forth.

The disclosed multi-task regression or classification system including learning and inference modules 10, 14 can also be embodied as a storage medium storing instructions executable by the electronic data processing device or devices 12, 16 to perform the functions of the learning and inference modules 10, 14. Such a storage medium may, for example, comprise a hard disk drive or other magnetic storage medium, or an optical disk or other optical storage medium, or a random access memory (RAM), read-only memory (ROM), flash memory, or other electronic storage medium, or so forth.

The illustrative multi-task learning module 10 groupings 20 of the input features. Without loss of generality, the number of features is denoted as D. The learning module 10 also receives a training set 22 of feature sets annotated with values for tasks. In a suitable arrangement and without loss of generality, the $n^{th}$ feature set of the training set 22 has values for the aforementioned D features and is suitably represented as a feature vector $x_n \in \mathbb{R}^D$. Each feature vector of the training set 22 is annotated with values for the tasks. In a suitable arrangement and without loss of generality, the $n^{th}$ feature set $x_n$ is annotated with values for P tasks which are suitably represented as a vector $y_n \in \mathbb{R}^P$.

The multi-task learning module 10 includes a Bayesian model construction sub-module 24 that constructs a Bayesian model representing relationships between the D features and the P tasks. The Bayesian model includes a matrix-variate prior having a features dimension of dimensionality D and a tasks dimension of dimensionality P. In the illustrative examples, each row of the matrix-variate prior corresponds to a task and each column corresponds to a feature, and the matrix-variate prior is written as $W \in \mathbb{R}^{P \times D}$. (Again, the skilled artisan can readily convert the illustrative formalism to the opposite formalism in which tasks correspond to rows and features to columns.) The matrix-variate prior $W \in \mathbb{R}^{P \times D}$ is partitioned into a plurality of blocks based on the groupings 20 of related features.

The multi-task learning module further includes a Bayesian model optimizer sub-module 26 that generates an optimized Bayesian model 30 by optimizing parameters of the Bayesian model (constructed by the construction sub-module 24) respective to the training set 22. The optimizing performed by the optimizer sub-module 26 includes inferring prior distributions for the blocks of the matrix-variate prior that induce sparseness of the plurality of blocks. The optimizer sub-module 26 optimizes the parameters of the Bayesian module while: (1) decomposing the matrix-variate prior to find low-rank matrix encoding task correlations; and (2) inferring prior distributions for the blocks of the multi-variate prior that enforce block sparsity.

The optimized (i.e., learned) Bayesian model 30 is used by the inference module 14. In illustrative FIG. 1, the inference module is a regression or classification module 14 that receives an input feature set 32 comprising the aforementioned D features, again suitably represented without loss of generality as a feature vector of the form $x_* \in \mathbb{R}^D$. The input feature set 32 is (in general) not annotated with values for the P tasks. Rather, the regression or classification module 14 predicts values 34 for the P tasks for the input set of feature values 32 using the optimized Bayesian model 30. The predicted values 34 are suitably represented without loss of generality as an inferred output vector $y_* \in \mathbb{R}^P$, where the value for each task (that is, each element of the output vector $y_*$) is a distribution.

In a regression analysis, the distribution $y_*$ 34, or an expectation value or other aggregate value of the distribution $y_*$ 34, typically serves as the useful output. In classification, the expectation or other aggregate value is typically thresholded to output a useful discrete (e.g., binary) value, for example to provide a binary decision as to whether or not the input object represented by the input feature set 32 should be assigned to the corresponding class. (Note that the post-inference processing is not illustrated in FIG. 1).

The multi-task regression or classification system of FIG. 1 finds use in various applications. By way of illustrative example pertaining to the previous example of applying textual labels to an image, the training set 22 in this application consists of feature vectors representing images of a set of training images, with each training image annotated by a set of textual labels. The P tasks correspond to the P textual labels of the label vocabulary (which may, in some embodiments, comprise hundreds, thousands, tens of thousands, or more labels). The groupings 20 in this case are suitably generated based on the structure of the feature vectors representing the images, and suitable groupings are typically readily discernable based on expected relationships between the various image features that make up the feature vector. The D features may number in the dozens, hundreds, or higher. The elements of the output distribution $y_*$ 34 correspond to the textual labels of the vocabulary, and the value for each element is thresholded to decide whether to assign the corresponding textual label to the image represented by the input vector 32.

The foregoing is merely an illustrative example of an application. The skilled artisan can readily apply the multi-task regression or classification of FIG. 1 to diverse applications such as prediction of tests scores in social sciences, the classification of protein functions in systems biology, the categorisation of scenes in computer vision, database (e.g., Internet) search and ranking, and so forth.

The disclosed multi-task learning techniques have been described herein with reference to FIG. 1. Further description is set forth next using mathematical notation to describe some illustrative examples.

In these illustrative examples, the matrix-variate prior is a matrix-variate Gaussian scaled mixture prior. For a matrix $W \in \mathbb{R}^{P \times D}$, the matrix-variate Gaussian density with mean matrix $M \in \mathbb{R}^{P \times D}$, row covariance $\Omega \in \mathbb{R}^{D \times D}$, and column covariance $\Sigma \in \mathbb{R}^{P \times P}$ is given by:

$$\mathcal{N}(M, \Omega, \Sigma) \propto e^{-\frac{1}{2} vec(W-M)^T (\Omega \otimes \Sigma)^{-1} vec(W-M)} \propto \qquad (2)$$

$$e^{-\frac{1}{2} tr\{\Omega^{-1}(W-M)^T \Sigma^{-1}(W-M)\}},$$

where the symbol $\propto$ means "proportional to".

If we let $\Sigma = E(W-M)(W-M)^T$, then $\Omega = E(W-M)^T(W-M)/c$ where c ensures the density integrates to one. While this introduces a scale ambiguity between $\Sigma$ and $\Omega$ (easily removed by means of a prior), the use of a matrix-variate formulation is appealing as it makes explicit the structure vec(W), which is a vector formed by the concatenation of the columns of W. This structure is reflected in its covariance matrix which is not of full rank, but is obtained by computing the Kronecker product of the row and the column covariance matrices.

We seek a solution for which the expectation of W is sparse, i.e., blocks of W are driven to zero. The predicting does not use a feature value of the input set of feature values for predicting the value of a task when the expectation of the element of the matrix-variate prior corresponding to the feature-task pair has a zero value (up to machine precision). A straightforward way to induce sparsity, and which would be equivalent to $l_1$-regularisation on blocks of W, is to consider a Laplace prior (or double exponential). Although applicable in a penalised likelihood framework, the Laplace prior would be computationally difficult in a Bayesian setting as it is not conjugate to the Gaussian likelihood. Hence, using this prior without modification would prevent computation of the posterior in closed form, even in a variational setting. In order to circumvent this problem, a hierarchical Bayesian approach is used in this illustrative embodiment.

Without loss of generality, the matrix-variate prior is partitioned into Q blocks, with each block being of the form $W_i \in \mathbb{R}^{P \times D_i}$ and with the partitioning meeting the completeness criterion $\Sigma_{i=1}^{Q} D_i = D$. We assume that the marginal prior, or effective prior, on each block $W_i \in \mathbb{R}^{P \times D_i}$ has the form of a matrix-variate Gaussian scale mixture, a generalisation of the multivariate Gaussian scale mixture:

$$p(W_i) = \int_0^\infty \mathcal{N}(0, \gamma_i^{-1} \Omega_i, \Sigma) p(\gamma_i) d\gamma_i \qquad (3),$$

where $\Omega_i \in \mathbb{R}^{D_i \times D_i}$, $\Sigma \in \mathbb{R}^{P \times P}$ and $\gamma_i > 0$ is the latent precision (i.e., inverse scale) associated to block $W_i$.

A sparsity inducing prior for $W_i$ can then be constructed by choosing a suitable hyperprior for $\gamma_i$. We impose a generalised inverse Gaussian prior on the latent precision variables:

$$\gamma_i \sim \mathcal{N}^{-1}(\omega, \chi, \phi) = \frac{\chi^{-\omega}(\sqrt{\chi\phi})^\omega}{2K_\omega(\sqrt{\chi\phi})} \gamma_i^{\omega-1} e^{-\frac{1}{2}(\chi\gamma_i^{-1}+\phi\gamma_i)} \quad (4)$$

where $K_\omega(\bullet)$ is the modified Bessel function of the second kind, $\omega$ is the index, $\sqrt{\chi\phi}$ defines the concentration of the distribution and $\sqrt{\chi/\phi}$ defines its scale.

The generalised inverse Gaussian prior is defined as follows:

$$x \sim \mathcal{N}^{-1}(\omega, \chi, \phi) = \frac{\chi^{-\omega}(\sqrt{\chi\phi})^\omega}{2K_\omega(\sqrt{\chi\phi})} x^{\omega-1} e^{-\frac{1}{2}(\chi x^{-1}+\phi x)} \quad (4.1)$$

where $x > 0$ and $K_\omega(\bullet)$ is the modified Bessel function of the second kind with index $\omega \in \mathbb{R}$. Depending on the value taken by $\omega$, we have the following constraints on $\chi$ and $\phi$:

$$\begin{cases} \omega > 0: & \chi \geq 0, \phi > 0 \\ \omega = 0: & \chi > 0, \phi > 0 \\ \omega < 0: & \chi > 0, \phi \geq 0. \end{cases} \quad (4.2)$$

The following expectations are useful:

$$\langle x \rangle = \sqrt{\frac{\chi}{\phi}} R_\omega(\sqrt{\chi\phi}), \quad (4.3)$$

$$\langle x^{-1} \rangle = \sqrt{\frac{\phi}{\chi}} R_{-\omega}(\sqrt{\chi\phi}),$$

$$\langle \ln x \rangle = \ln\sqrt{\frac{\chi}{\phi}} + \frac{d\ln K_\omega(\sqrt{\chi\phi})}{d\omega}$$

where $R_\omega(\bullet) \equiv K_{\omega+1}(\bullet)/K_\omega(\bullet)$. When $\chi = 0$ and $\omega > 0$, the generalised inverse Gaussian distribution reduces to the Gamma distribution $$x \sim \mathcal{G}(a, b) = \frac{b^a}{\Gamma(a)} x^{a-1} e^{-bx},$$

where $a, b > 0$ and $\Gamma(\bullet)$ is the (complete) gamma function. The expectations of Equation (4.3) take the following simplified forms:

$$\langle x \rangle = \frac{a}{b}, \quad (4.4)$$

$$\langle x^{-1} \rangle = \begin{cases} \frac{b}{a-1} & a \geq 1 \\ \infty & a < 1 \end{cases},$$

$$\langle \ln x \rangle = \psi(a) - \ln b,$$

where $\psi(\bullet) = \ln \Gamma(\bullet)'$ is the digamma function. When $\phi = 0$ and $\omega < 0$, the generalised inverse Gaussian distribution reduces to the inverse Gamma distribution $$x \sim \mathcal{IG}(a, b) = \frac{b^a}{\Gamma(a)} x^{-a-1} e^{-\frac{b}{x}},$$

where $a > 0$ and $b > 0$. The expectations of Equation (4.3) take the following simplified forms:

$$\langle x \rangle = \begin{cases} \frac{b}{a-1} & a \geq 1 \\ \infty & a < 1 \end{cases}, \quad (4.5)$$

$$\langle x^{-1} \rangle = \frac{a}{b},$$

$$\langle \ln x \rangle = \ln b - \psi(a).$$

The effective prior is then a symmetric matrix-variate generalised hyperbolic distribution derived from a matrix-variate Gaussian scale mixture:

$$p(W_i) \propto \frac{K_{\omega + \frac{PD_i}{2}}\left(\sqrt{\chi(\phi + tr\{\Omega_i^{-1} W_i^T \Sigma^{-1} W_i\})}\right)}{\left(\sqrt{\frac{\phi + tr\{\Omega_i^{-1} W_i^T \Sigma^{-1} W_i\}}{\chi}}\right)^{\omega + \frac{PD_i}{2}}}. \quad (5)$$

The marginal has fat tails compared to the matrix-variate Gaussian. In particular, the family contains the matrix-variate Student-t, the matrix-variate Laplace and the matrix-variate Variance-Gamma as special cases.

In optimizing the Bayesian model, $\{W_i\}_{i=1}^Q$, $\{\Omega_i\}_{i=1}^Q$ and $\{\gamma_1, \ldots, \gamma_{D_1}, \ldots, \gamma_1, \ldots, \gamma_{D_Q}\}$ are viewed as latent variables that are to be marginalised over. This is motivated by the fact that overfitting is avoided by integrating out all parameters whose cardinality scales with the model complexity, i.e., the number of dimensions and/or the number of tasks. We further introduce a latent projection matrix $V \in \mathbb{R}^{P \times K}$ and a set of latent matrices $\{Z_i\}_{i=1}^Q$ to make a low-rank approximation of the column covariance $\Sigma$ as explained below. Note also that $\Omega_i$, captures the correlations between the rows of group i.

Figure 2:
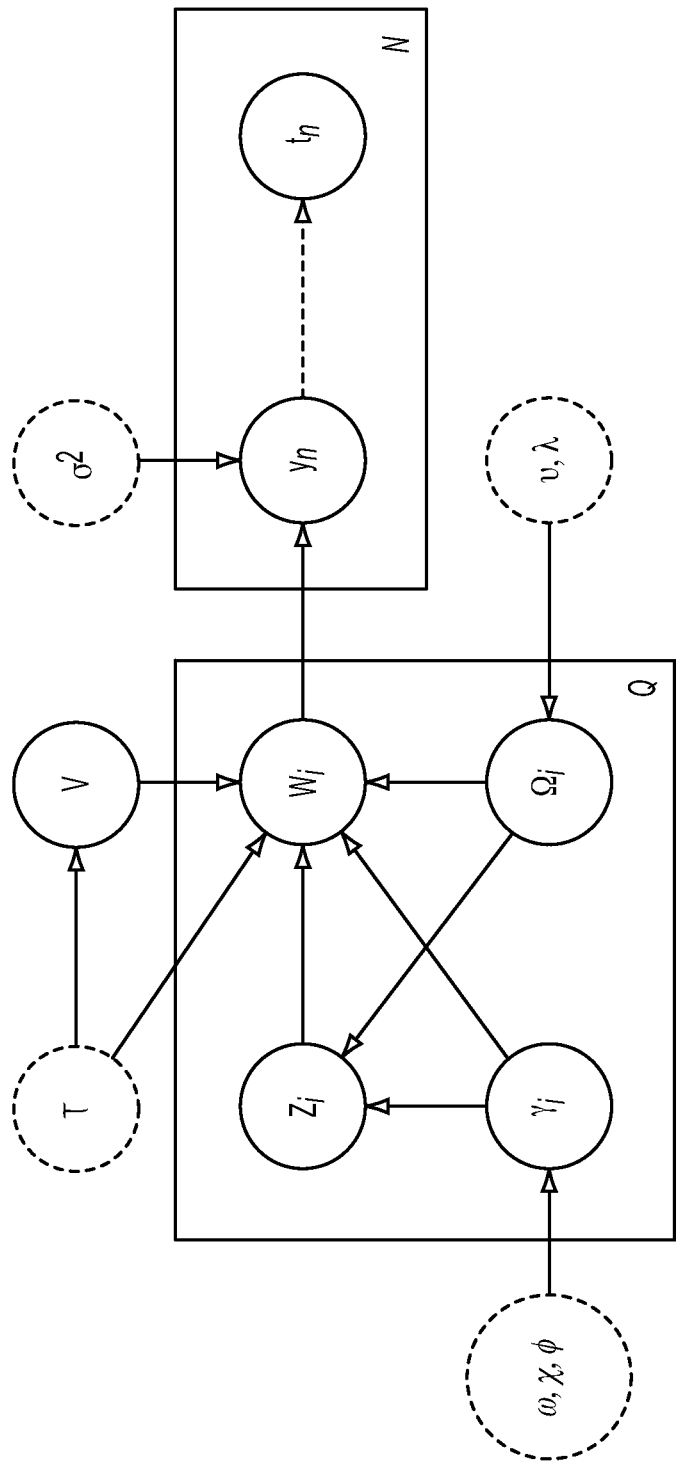
FIG. 2 diagrammatically shows the graphical model for the sparse Bayesian multiple regression (when excluding the dashed arrow) and sparse Bayesian multiple classification (when including the dashed arrow).

With reference to FIG. 2, the complete probabilistic model is given by:

$$y_n|W, x_n \sim \mathcal{N}(Wx_n, \sigma^2 I_P), V \sim \mathcal{N}(0, \tau I_P, I_K),$$

$$W_i|V, Z_i, \Omega_i, \gamma_i \sim \mathcal{N}(VZ_i, \gamma_i^{-1}\Omega_i, \tau I_P), \Omega_i \sim \mathcal{W}^{-1}(v, \lambda I_{D_i}),$$

$$Z_i|\Omega_i, \gamma_i \sim \mathcal{N}(0, \gamma_i^{-1}\Omega_i, I_K), \gamma_i \sim \mathcal{N}^{-1}(\omega, \chi, \phi), \quad (6),$$

where $\sigma^2$ is the residual noise variance and r is residual variance associated to W. In FIG. 2, the parameters that are optimized by the Bayesian model optimizer (see FIG. 1) are shown encircled by dashed-line circles, while random variables of the Bayesian model are shown encircled by solid-line circles. We reparametrise the inverse Wishart distribution and define it as follows:

$$\Omega \sim \mathcal{W}^{-1}(v, \Lambda) = \frac{|\Lambda|^{\frac{D+v-1}{2}} |\Omega^{-1}|^{\frac{2D+v}{2}}}{2^{\frac{(D+v-1)D}{2}} \Gamma_D\left(\frac{D+v-1}{2}\right)} e^{-\frac{1}{2}tr\{\Lambda\Omega^{-1}\}}, \quad (6.1)$$

-continued $$\upsilon > 0$$

where $$\Gamma_p(z) = \pi^{\frac{p(p-1)}{4}} \prod_{j=1}^{p} \Gamma\left(z + \frac{1-j}{2}\right).$$

Using the compact notations $W=(W_1, \ldots, W_Q)$, $Z=(Z_1, \ldots, Z_Q)$, $\Omega=\{\Omega_1, \ldots, \Omega_Q\}$ and $\Gamma=\{\gamma_1 \ldots, \gamma_{D_1}, \ldots, \gamma_1, \ldots, \gamma_{D_Q}\}$, we can compute the following marginal:

$$p(W \mid V, \Omega) \propto \int\int \mathcal{N}(VZ, \Gamma^{-1}\Omega, \tau I_P)\mathcal{N}(0, \Gamma^{-1}\Omega, I_K)p(\Gamma)dZd\Gamma = \quad (6.2)$$

$$\int \mathcal{N}(0, \Gamma^{-1}\Omega, VV^T + \tau I_P)p(\Gamma)d\Gamma.$$

Thus, the probabilistic model induces sparsity in the blocks of W, while taking correlations between the task parameters into account through the random matrix $\Sigma \approx VV^T + \tau I_P$. In these operations the matrix-variate prior is decomposed into a product of matrices including a matrix V of low rank in the tasks dimension (i.e., the rows dimension in the illustrative examples) that encodes positive or negative correlations between tasks. This is especially useful when there is a large number of tasks.

The latent variables $\mathcal{Z} = \{W, V, Z, \Omega, \Gamma\}$ are inferred by variational expectation-maximization (EM), while the hyperparameters $\theta = \{\sigma^2, \tau, \upsilon, \lambda, \omega, \chi, \phi\}$ are estimated by type II maximum likelihood (type II ML). The use of variational inference in the illustrative examples is motivated by the fact that deterministic approximate inference schemes converge faster than traditional sampling methods such as Markov chain Monte Carlo (MCMC), and their convergence can easily be monitored. The choice of learning the hyperparameters by type II ML is advantageous over alternative approaches such as placing vague priors over them, although this is also a contemplated inference approach.

In order to find a tractable solution, we assume that the variational posterior $q(\mathcal{Z})=q(W,V,Z,\Omega,\Gamma)$ factorises as $q(W)q(V)q(,Z)q(\Omega)q(\Gamma)$ given the data $D=\{(y_n, x_n)\}_{n=1}^{N}$ (that is, given the training set 22 of FIG. 1). The variational EM in combination with the type II ML estimation of the hyperparameters cycles through the following two steps until convergence. Step (1) is to update of the approximate posterior of the latent variables and parameters for fixed hyperparameters where the update for W is given by:

$$q(W) \propto e^{\langle \ln p(\mathcal{D},\mathcal{Z}|\vartheta)\rangle_{q(\mathcal{Z}/W)}} \quad (7)$$

and where $\mathcal{Z}/W$ is the set $\mathcal{Z}$ with W removed and $\langle \cdot \rangle_q$ denotes the expectation with respect to q. The posteriors of the other latent matrices have the same form. Step (2) is to update the hyperparameters for fixed variational posteriors:

$$\vartheta \leftarrow \operatorname*{argmax}_{\vartheta} \langle \ln p(\mathcal{D}, \mathcal{Z}, \mid \vartheta)\rangle_{q(\mathcal{Z})}. \quad (8)$$

Variational EM converges to a local maximum of the log-marginal likelihood. The convergence can be checked by monitoring the variational lower bound, which monotonically increases during the optimisation.

Next, we give the explicit expression of the variational EM steps and the updates for the hyperparameters. The variational E step (mean field) is as follows. Assuming a factorised posterior enables us to compute it in closed form as the priors are each conjugate to the Gaussian likelihood. The approximate posterior is given by:

$$q(\mathcal{Z}) = \mathcal{N}(M_W, \Omega_W, S_W)\mathcal{N}(M_V, \Omega_V, S_V)\mathcal{N}(M_Z, \Omega_Z, S_Z) \times \quad (9)$$

$$\prod_i \mathcal{W}^{-1}(\upsilon_i, \Lambda_i)\mathcal{N}^{-1}(\omega_i, \chi_i, \phi_i).$$

Now, let $X \in \mathbb{R}^{D \times N}$ and $Y \in \mathbb{R}^{P \times N}$. The parameters of the matrix-variate posteriors in Equation (9) are given by:

$$M_W = (\tau^{-1}\langle V\langle\langle Z\langle\langle\Omega^{-1}\rangle\rangle\rangle\Gamma\rangle + \sigma^{-2}YX^T)\Omega_W, S_W = I_P$$

$$\Omega_W = (\tau^{-1}\langle\langle\Omega^{-1}\rangle\rangle\Gamma\langle + \sigma^{-2}XX^T)^{-1} \quad (9.1),$$

$$M_{Z_i} = \tau^{-1}S_{Z_i}\langle V^T\rangle W_i\rangle, S_{Z_i} = (\tau^{-1}\langle V^T V\rangle + I_K)^{-1}$$

$$\Omega_{Z_i} = \langle\gamma_i\rangle^{-1}\langle\Omega_i^{-1}\rangle^{-1}, \quad (9.2),$$

and $$M_V = \langle W\langle\langle\Omega^{-1}\rangle\rangle\Gamma\rangle\langle Z^T\langle\Omega_V, S_V\tau I_P$$

$$\Omega_V = (\Sigma_i\langle\gamma_i Z_i\Omega_i^{-1}Z_i^T\rangle + I_K)^{-1} \quad (9.3)$$

where $\langle\Omega_i^{-1}\rangle = (D_i + \upsilon_i - 1)\Lambda_i^{-1}$. The posterior parameters of the inverse Wishart are given by $\upsilon_i = \upsilon + P + K$ and $\Lambda_i = \tau^{-1}\langle\gamma_i(W_i - VZ_i)^T(W_i - VZ_i)\rangle + \langle\gamma_i Z_i^T Z_i\rangle + \lambda_{D_i}$. Finally, the posterior parameters of the generalised inversed Gaussian are given by $$\omega_i = \omega + \frac{(P+K)D_i}{2},$$

$\chi_i = \chi$ and $\phi_i = \phi + \tau^{-1}\mathrm{tr}\langle(W_i - VZ_i)\Omega_i^{-1}(W_i - VZ_i)^T\rangle + \mathrm{tr}\langle Z_i\Omega_i^{-1}Z_i^T\rangle$.

The computational bottleneck in the variational EM resides in the inversion of $\Omega_W$ which is $o(D^3)$ per iteration. When $D>N$, we can use the Woodbury identity for a matrix inversion of complexity $o(N^3)$ per iteration.

The hyperparameter updates are addressed next. To learn the degree of sparsity from data we optimize the hyperparameters. There are no closed form updates for $\{\omega, \chi, \phi\}$. Hence, we need to find the root of the following expressions:

$$\omega: Q\ln\sqrt{\frac{\phi}{\chi}} - Q\frac{d\ln K_\omega(\sqrt{\chi\phi})}{d\omega} \sum_i \langle \ln\gamma_i\rangle = 0, \quad (10)$$

$$\chi: \frac{Q\omega}{\chi} - \frac{Q}{2}\sqrt{\frac{\phi}{\chi}} R_\omega(\sqrt{\chi\phi}) + \frac{1}{2}\sum_i \langle\gamma_i^{-1}\rangle = 0, \quad (11)$$

and $$\phi: Q\sqrt{\frac{\chi}{\phi}} R_\omega(\sqrt{\chi\phi}) - \sum_i \langle\gamma_i\rangle = 0, \quad (12)$$

where Equation (4.3) is invoked. The root can be found by line search, standard nonlinear optimisation techniques, or so forth. In the general case, the derivative in Equation (10) is estimated numerically. However, when considering special cases of the mixing density such as the Gamma or the inverse Gamma, simplified updates are obtained and no numerical differentiation is required.

The type II ML update for a and r are as follows:

$$\sigma^2 \leftarrow \frac{1}{NP} tr\langle (Y-WX)(Y-WX)^T \rangle \quad (13)$$

and $$\tau \leftarrow \frac{1}{P(K+D)} tr\{\langle V^T V \rangle + \langle \Gamma \Omega^{-1}(W-VZ)^T(W-VZ) \rangle\}, \quad (14)$$

where $X=(x_1, \ldots, x_N)$ and $Y=(y_1, \ldots, y_N)$.

With reference back to FIG. 1, the foregoing processing is suitably performed by the Bayesian model optimizer sub-module 26 of the multi-task learning module 10 to generate the optimized Bayesian model 30. Next, some illustrative embodiments of inference by the regression or classification module 14 using the optimized Bayesian model 30 is described.

The regression or classification module 14 (see FIG. 1) suitably performs the task value predictions by Bayesian averaging. The predictive distribution is suitably approximated as follows:

$$p(y_*|x_*) \approx \int p(y_*|W,x_*)q(W)dW = \mathcal{N}(M_W x_*, (\zeta^2 + x_*^T \Omega_W x_*)I_P) \quad (15).$$

FIG. 2 provides a suitable representation of the optimized Bayesian model 30 when the values of the parameters (shown encircled by dashed-line circles in FIG. 2) are set to their optimized values as determined by the Bayesian model optimizer sub-module 26. The output of the optimized Bayesian model 30 for a given input are the values $y_n$ for the parameters, which are actually distributions $y_*$ in the inference stage as denoted in Equation (15). In a regression analysis, these distributions $y_*$, or an expectation value or other aggregate value of the distribution $y_*$, typically serves as the useful output.

In classification, the expectation or other aggregate value is typically thresholded or otherwise further processed in order to output a useful discrete (e.g., binary) value. This is indicated in FIG. 2 by the dashed line and the last output $t_n$ which is the thresholded value. Sparse Bayesian multiple classification can be performed as follows. We restrict ourselves to multiple binary classifiers and consider a probit model in which the likelihood is derived from the Gaussian cumulative density. (A logit model could also be contemplated, the resulting algorithm being adapted accordingly.) A probit model is equivalent to a Gaussian noise and a step function likelihood. Let $t_n \in \mathbb{R}^P$ be the class label vectors, with $t_{np} \in \{-1, +1\}$ for all n. The likelihood of Equation (15) is replaced by:

$$t_n | y_n \sim \prod_p I(t_{np} y_{np}), \quad y_n | W, x_n \sim \mathcal{N}(Wx_n, \sigma^2 I_P), \quad (16)$$

where $I(z)=1$ for $z \geq 0$ and 0 otherwise. The rest of the model is as before; we will set $\sigma=1$. The latent variables to infer are now Y and Z. Again, we assume a factorized posterior. We further assume the variational posterior $q(Y)$ is a product of truncated Gaussians, yielding:

$$q(Y) \propto \prod_n \prod_p I(t_{np} y_{np}) \mathcal{N}(v_{np}, 1) = \quad (17)$$

$$\prod_{t_{np}=+1} \mathcal{N}_+(v_{np}, 1) \prod_{t_{np}=-1} \mathcal{N}_-(v_{np}, 1),$$

where $v_{np}$ is the $p^{th}$ entry of $v_n = M_W x_n$. The (positive/negative) truncated Gaussian density is defined as $\mathcal{N}_\pm(\mu, \sigma^2) = \Phi(\pm\mu/\sigma)^{-1} \mathcal{N}(\mu, \sigma^2)$, where $\Phi(\alpha) = \int_{-\infty}^{\alpha} \mathcal{N}(0,1)dz$ is the cumulative density of the unit Gaussian. Let $x_\pm \sim \mathcal{N}_\pm(\mu, \sigma^2)$. The mean and variance are given by:

$$\langle x_\pm \rangle = \mu \pm \sigma^2 \mathcal{N}_\pm(0|\mu, \sigma^2) \quad (17.1)$$

and $$\langle (x_\pm - \langle x_\pm \rangle)^2 \rangle = \sigma^2 \mp \sigma^2 \mu \mathcal{N}_\pm(0|\mu, \sigma^2) - \sigma^4 \mathcal{N}_\pm(0|\mu, \sigma^2)^2 \quad (17.2)$$

The other variational and hyperparameter updates are unchanged, except that Y is replaced by matrix $v_\pm$. The elements of $v_\pm$ are defined in Equation (17.1).

In Bayesian classification the goal is to predict the label with highest posterior probability. Based on the variational approximation the following classification rule is appropriate:

$$\hat{t}_* = \arg \max_{t_*} P(t_* | T) \quad (18)$$

$$\approx \arg \max_{t_*} \prod_p \int \mathcal{N}_{t_{*p}}(v_{*p}, 1) dy_{*p}$$

$$= \arg \max_{t_*} \prod_p \Phi(t_{*p} v_{*p}),$$

where $v_* = M_W x_*$. Hence, to decide whether the label $t_{*p}$ is $-1$ or $+1$ it is sufficient to use the sign of $v_{*p}$ as the decision rule. However, the probability $P(t_{*p}|T)$ tells us also how confident we are in the prediction we make.

Figure 3:
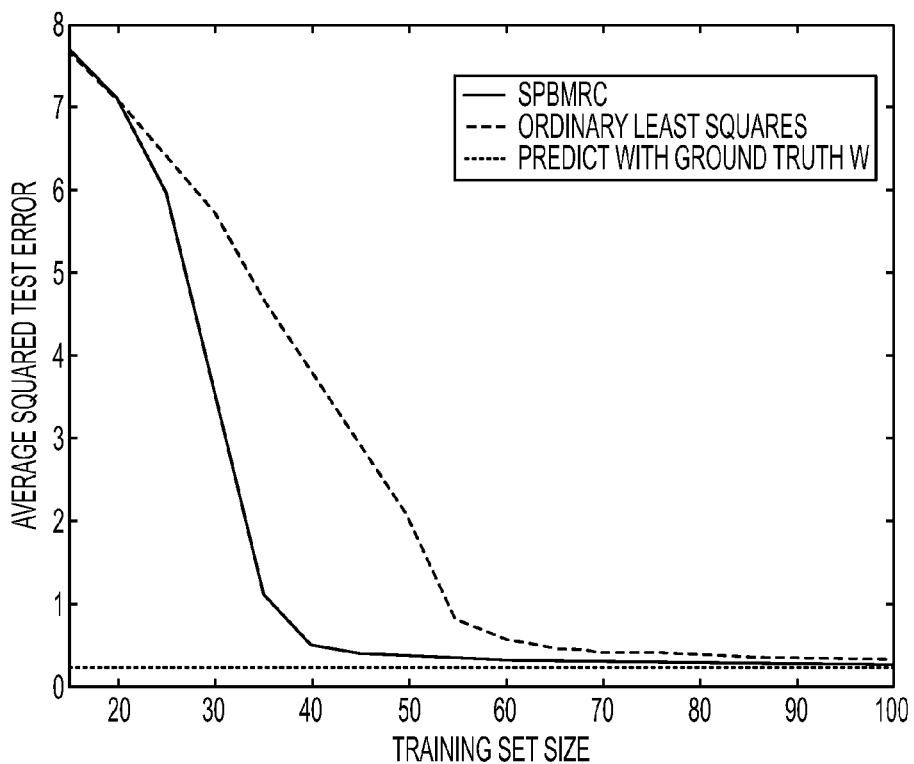
Figure 4:
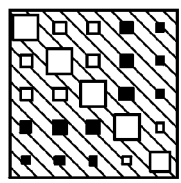
Figure 5:
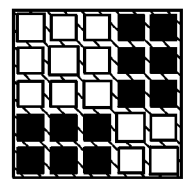
Figure 6:
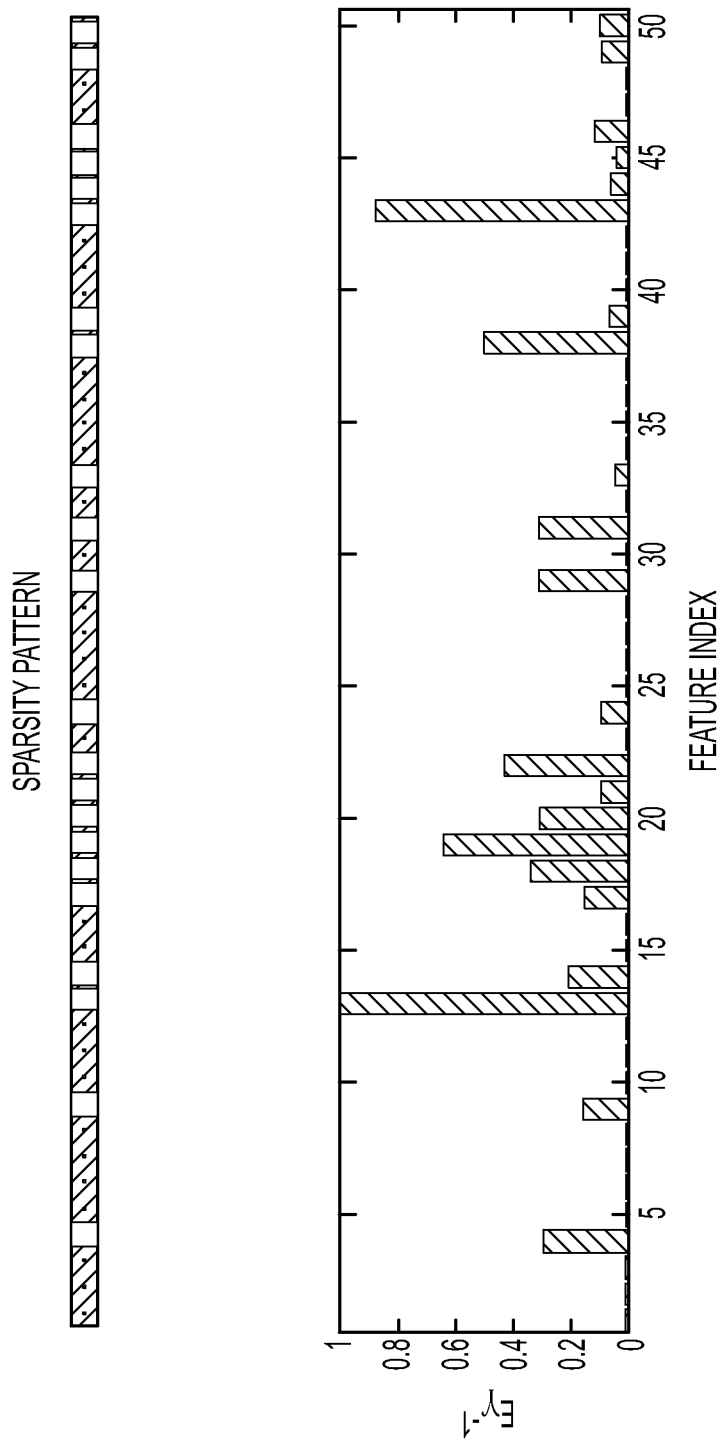

With reference to FIGS. 3-7, to verify the expected properties of the disclosed multi-task model a regression problem with known parameters was processed. FIGS. 3-7 shows results for 5 tasks, 50 features, and a matrix W drawn using $V=[\sqrt{0.9}\sqrt{0.9}\sqrt{0.9}-\sqrt{0.9}-\sqrt{0.9}]^T$ and $\tau=0.1$, i.e. the covariance for vec(W) has 1's on the diagonal and ±0.9 on the off-diagonal elements. The first three tasks and the last two tasks are positively correlated. There is a negative correlation between the two groups. The active features were randomly selected among the 50 candidate features. The models were evaluated with $10^4$ test points and the experiment was repeated 25 times. Gaussian noise was added to the targets ($\sigma=0.1$). FIG. 3 shows the prediction accuracy on a test set as a function of training set size. The approach disclosed herein (solid line in FIG. 3) shows lower error achieved with smaller training sets. FIG. 4 shows the estimated task covariance while FIG. 5 shows the true task covariance. Reasonable correspondence is seen, indicating that the disclosed approaches for enforcing sparsity in the matrix-variate prior are effective. FIG. 6 (top) shows the sparsity pattern, and FIG. 6 (bottom) shows the inverse of the posterior mean showing that the sparsity is correctly captured. FIG. 7 shows Hinton diagrams of the true weight matrix (bottom), ordinary least squares learnt weight matrix (middle), and the sparse Bayesian multi-task learnt weight matrix (top). The ordinary least squares learnt contains many non-zero elements, i.e. has less sparsity. It is observed that the disclosed model performs better and converges faster to the optimal performance (as per FIG. 3) when the data set size increases compared ordinary least squares. Note also that both Σ and the sparsity pattern are correctly identified.

Further evaluation was performed using two data sets: Yeast (Elisseeff et al., "A kernel method for multi-labelled classification", *NIPS* 2002) and Scene (Boutell et al., "Learning multi-label scene classification", *Pattern Recognition*, 37(9):1757-71, 2004), which have been widely used as test-beds to evaluate multi-task learning approaches. These results showed that even for small values of K (that is, fewer parameters in the column covariance) the disclosed model achieved good results. These evaluations indicated substantial advantage to using hierarchical priors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
an electronic data processing device configured to perform a method comprising:
constructing a Bayesian model representing relationships between a plurality of features and a plurality of tasks wherein the Bayesian model includes a matrix-variate Gaussian scaled mixture prior having a features dimension and a tasks dimension and wherein the matrix-variate Gaussian scaled mixture prior is partitioned into a plurality of blocks;
generating an optimized Bayesian model by optimizing parameters of the Bayesian model respective to training data comprising sets of feature values annotated with values for tasks of the plurality of tasks wherein the optimizing includes inferring prior distributions for the blocks of the matrix-variate Gaussian scaled mixture prior that induce sparseness of the plurality of blocks; and
predicting values of tasks of the plurality of tasks for an input set of feature values using the optimized Bayesian model.

2. The apparatus of claim 1, wherein the optimizing comprises:
decomposing the matrix-variate Gaussian scaled mixture prior into a product of matrices including a matrix of reduced rank in the tasks dimension that encodes positive or negative correlations between tasks of the plurality of tasks.

3. The apparatus of claim 1, wherein the predicting does not use a feature value of the input set of feature values for predicting the value of a task when the expectation of the element of the matrix-variate Gaussian scaled mixture prior corresponding to the feature-task pair has a zero value.

4. An apparatus comprising:
an electronic data processing device configured to perform a method comprising:
constructing a Bayesian model representing relationships between a plurality of features and a plurality of tasks wherein the Bayesian model includes a matrix-variate prior having a features dimension and a tasks dimension and wherein the matrix-variate prior is partitioned into a plurality of blocks;
generating an optimized Bayesian model by optimizing parameters of the Bayesian model respective to training data comprising sets of feature values annotated with values for tasks of the plurality of tasks wherein the optimizing includes inferring prior distributions for the blocks of the matrix-variate prior that induce sparseness of the plurality of blocks; and
predicting values of tasks of the plurality of tasks for an input set of feature values using the optimized Bayesian model, wherein the predicting does not use a feature value of the input set of feature values for predicting the value of a task when the expectation of the element of the matrix-variate prior corresponding to the feature-task pair has a zero value.

5. An apparatus comprising:
an electronic data processing device configured to perform a method comprising:
constructing a Bayesian model representing relationships between a plurality of features and a plurality of tasks wherein the Bayesian model includes a matrix-variate prior having a features dimension and a tasks dimension and wherein the matrix-variate prior is partitioned into a plurality of blocks;
generating an optimized Bayesian model by optimizing parameters of the Bayesian model respective to training data comprising sets of feature values annotated with values for tasks of the plurality of tasks wherein the optimizing employs a variational expectation-maximization (variational E-M) algorithm and wherein the optimizing includes inferring prior distributions for the blocks of the matrix-variate prior that induce sparseness of the plurality of blocks; and
predicting values of tasks of the plurality of tasks for an input set of feature values using the optimized Bayesian model.

6. A method comprising:
generating an optimized Bayesian model by optimizing parameters of a Bayesian model representing relationships between a plurality of features and a plurality of tasks respective to training data comprising sets of feature values annotated with values for tasks of the plurality of tasks, the Bayesian model including a matrix-variate Gaussian scaled mixture prior having a features dimension and a tasks dimension, the optimizing including decomposing the matrix-variate Gaussian scaled mixture prior into a product of matrices including a matrix of reduced rank in the tasks dimension that encodes positive or negative correlations between tasks of the plurality of tasks; and
predicting values of tasks of the plurality of tasks for an input set of feature values using the optimized Bayesian model;
wherein the generating and predicting are performed by an electronic data processing device.

7. The method of claim 6, wherein the matrix-variate Gaussian scaled mixture prior is partitioned into a plurality of blocks and the optimizing of parameters of the Bayesian model includes inferring prior distributions for the blocks of the matrix-variate Gaussian scaled mixture prior that induce sparseness of the plurality of blocks.

8. The method of claim 7, wherein the predicting does not use a feature value of the input set of feature values for predicting the value of a task when the expectation of the element of the matrix-variate Gaussian scaled mixture prior corresponding to the feature-task pair has a zero value.

9. The method of claim 6, wherein the optimizing employs a variational expectation-maximization (variational E-M) algorithm.

10. A non-transitory storage medium storing instructions executable by an electronic data processing device to perform operations including (1) generating an optimized Bayesian model by optimizing parameters of a Bayesian model representing relationships between D features and P tasks, where $D \geq 1$ and $P \geq 1$, respective to training data comprising sets of values for the D features annotated with values for the P tasks, the Bayesian model including a matrix-variate prior $W \in \mathbb{R}^{P \times D}$ or $W \in \mathbb{R}^{D \times P}$ having a features dimension of dimensionality D corresponding to the D features and a tasks dimension of dimensionality P corresponding to the P tasks, wherein the matrix-variate prior is partitioned into a plurality of blocks $W_i \in \mathbb{R}^{P \times D_i}$ or $W_i \in \mathbb{R}^{D_i \times P}$ where $i=1, \ldots, Q$ and $\Sigma_{i=1}^{Q} D_i = D$ and the optimizing of parameters of the Bayesian model includes inferring prior distributions for the blocks of the matrix-variate prior that induce sparseness of the plurality of blocks and (2) predicting values of the P tasks for a set of input values for the D features using the optimized Bayesian model.

11. The non-transitory storage medium of claim 10, wherein the optimizing comprises decomposing the matrix-variate prior into a product of matrices including a matrix of reduced rank in the tasks dimension that encodes positive or negative correlations between tasks of the P tasks.

12. The non-transitory storage medium of claim 11, wherein the matrix-variate prior comprises a matrix-variate Gaussian scaled mixture prior.

13. The non-transitory storage medium of claim 11, wherein the predicting does not use the input value for a $d^{th}$ feature for predicting the value of a $p^{th}$ task when the element of the matrix-variate prior at the $d^{th}$ feature dimension and $p^{th}$ task dimension has a zero value.

14. The non-transitory storage medium of claim 11, wherein the optimizing employs a variational expectation-maximization (variational E-M) algorithm.

15. The non-transitory storage medium of claim 10, wherein the predicting does not use the input value for a $d^{th}$ feature for predicting the value of a $p^{th}$ task when the expectation of the element of the matrix-variate prior at the $d^{th}$ feature dimension and $p^{th}$ task dimension has a zero value.

16. The non-transitory storage medium of claim 10, wherein the matrix-variate prior comprises a matrix-variate Gaussian scaled mixture prior.

* * * * *